US012583755B2

(12) United States Patent
Aikyo et al.

(10) Patent No.: US 12,583,755 B2
(45) Date of Patent: Mar. 24, 2026

(54) SPHERICAL ALUMINA POWDER, RESIN COMPOSITION, AND HEAT DISSIPATION MATERIAL

(71) Applicant: DENKA COMPANY LIMITED, Tokyo (JP)

(72) Inventors: Teruhiro Aikyo, Omuta (JP); Tomohiro Kawabata, Arao (JP); Jun Yamaguchi, Omuta (JP); Atsushi Yamashita, Miyama (JP)

(73) Assignee: Denka Company Limited, Tokyo (JP)

( * ) Notice: Subject to any disclaimer, the term of this patent is extended or adjusted under 35 U.S.C. 154(b) by 352 days.

(21) Appl. No.: 18/028,956

(22) PCT Filed: Sep. 24, 2021

(86) PCT No.: PCT/JP2021/035146

§ 371 (c)(1),
(2) Date: Mar. 28, 2023

(87) PCT Pub. No.: WO2022/071140

PCT Pub. Date: Apr. 7, 2022

(65) Prior Publication Data

US 2023/0331572 A1 Oct. 19, 2023

(30) Foreign Application Priority Data

Sep. 29, 2020 (JP) ................................. 2020-163861

(51) Int. Cl.
| | |
|---|---|
| *C01F 7/02* | (2022.01) |
| *C08K 7/18* | (2006.01) |
| *C08L 83/04* | (2006.01) |

(52) U.S. Cl.
CPC ................. *C01F 7/02* (2013.01); *C08K 7/18* (2013.01); *C08L 83/04* (2013.01); *C01P 2004/32* (2013.01); *C01P 2004/51* (2013.01); *C08K 2201/003* (2013.01)

(58) Field of Classification Search
CPC ...... C08K 7/04; C08K 2201/003; C08K 7/18; C01F 7/02; C01P 2004/32; C01P 2004/51
USPC .......................................... 428/323; 524/437
See application file for complete search history.

(56) References Cited

U.S. PATENT DOCUMENTS

| | | | | |
|---|---|---|---|---|
| 10,968,111 | B2 * | 4/2021 | Hofius | C01F 7/023 |
| 2005/0182172 | A1 * | 8/2005 | Kamimura | C01F 7/442 |
| | | | | 423/625 |
| 2011/0046267 | A1 | 2/2011 | Tanaka et al. | |
| 2011/0077329 | A1 | 3/2011 | Nishi et al. | |
| 2011/0256051 | A1 | 10/2011 | Sawano et al. | |
| 2014/0302977 | A1 * | 10/2014 | Kunisa | C03C 1/02 |
| | | | | 264/117 |
| 2016/0102109 | A1 * | 4/2016 | Maeda | H01L 23/293 |
| | | | | 525/506 |
| 2017/0210886 | A1 | 7/2017 | Ikeda et al. | |
| 2022/0169571 | A1 * | 6/2022 | Kimura | C04B 35/62892 |
| 2023/0134132 | A1 * | 5/2023 | Komaki | C09K 5/14 |
| | | | | 423/625 |
| 2023/0193103 | A1 * | 6/2023 | Komaki | C09K 5/14 |
| | | | | 252/62 |

FOREIGN PATENT DOCUMENTS

| | | | | |
|---|---|---|---|---|
| CN | 102007073 A | 4/2011 | | |
| CN | 102066254 A | 5/2011 | | |
| CN | 102249276 A | 11/2011 | | |
| CN | 106660817 A | 5/2017 | | |
| CN | 112607756 | * 4/2021 | ............... | C08K 3/22 |
| JP | H03-066151 A | 3/1991 | | |
| JP | H06-080863 A | 3/1994 | | |
| JP | H06157029 | * 3/1994 | ............... | C01F 7/42 |
| JP | H08-003365 A | 1/1996 | | |
| JP | 2004-244491 A | 9/2004 | | |
| JP | 2007-070474 A | 3/2007 | | |
| JP | 2007-290876 A | 11/2007 | | |
| JP | 2011-225385 A | 11/2011 | | |
| JP | 2012121793 A | * 6/2012 | ............... | C01F 7/02 |
| JP | 2020-105047 A | 7/2020 | | |
| WO | WO-2013153618 A1 | * 10/2013 | ............... | C01F 7/36 |

(Continued)

OTHER PUBLICATIONS

CN112607756 Translation (Year: 2021).*
JP 2012121793 translation (Year: 2012).*
WO 2022071137 translation (Year: 2022).*
English translation Written Opinion JP 2021035146 (Year: 2021).*
Translation JP H06157029 (Year: 1994).*
Translation WO 2013/153618 (Year: 2013).*
Nov. 2, 2021 International Search Report issued in International Patent Application No. PCT/JP2021/035146.

*Primary Examiner* — Jennifer McNeil
(74) *Attorney, Agent, or Firm* — Oliff PLC

(57) ABSTRACT

A spherical alumina powder having a maximum particle diameter showing a maximum peak in the range of 35 to 70 μm, a frequency of 5 to 15%, and an accumulated value of frequencies respectively at 20 particle diameter points, obtained by dividing a particle diameter range of 1 to 20 μm equally into 19 sections, of 3 to 17% by volume, the powder providing a ratio $(V_Y/V_X)$ of a viscosity $V_Y$ of a resin composition Y to a viscosity $V_X$ of a resin composition X of 0.85 or more, composition X containing the powder and a vinyl group-containing polymethylsiloxane, the powder being contained in an amount of 88.1% by mass, the resin composition Y being the same as X except for containing the same powder as in composition X in an amount of 79.3% by mass and containing a powder for testing in an amount of 8.8% by mass.

3 Claims, No Drawings

(56) References Cited

FOREIGN PATENT DOCUMENTS

| WO | 2016/017637 | A1 | | 2/2016 | | |
| WO | WO-2022071137 | A1 | * | 4/2022 | ........... | C04B 35/117 |

* cited by examiner

SPHERICAL ALUMINA POWDER, RESIN COMPOSITION, AND HEAT DISSIPATION MATERIAL

TECHNICAL FIELD

The present invention relates to a spherical alumina powder, a resin composition, and a heat dissipation material.

BACKGROUND ART

In recent years, in response to requirement for reducing the size and weight and increasing the performance of electronic equipment, reduction in size, thickness, and pitch of semiconductor packages has been rapidly accelerated. The mounting method is dominated by surface mounting which is suitable for high-density mounting on a circuit board or the like. With such advancement in semiconductor packages and mounting method thereof, an increase in functionality is required also for heat dissipation materials, and highly filling of a silicone resin with a ceramic powder, in particular, a spherical alumina powder, have been aggressively studied. A problem of highly filling with a ceramic powder is an increased viscosity of the material, leading to an increase in mold-processing defects.

For solving the above problem, improvements have been performed on the side of the resin and on the side of the ceramic powder. Examples of the improvement on the side of the ceramic powder include a method in which the Wadell's sphericity is increased to 0.7 to 1.0 (PTL 1), a method in which the gradient of a straight line expressed in the Rosin-Rammler diagram is made into 0.6 to 0.95 to expand a particle size distribution (PTL 2), and a method in which several peaks are provided in a particle size distribution to give a multipeak particle size distribution to thus bring a ceramic powder close to a close-packed structure (PTL 3). However, the above methods remain insufficient, and when the filling ratio is increased, the viscosity of the material rapidly increases.

CITATION LIST

Patent Literature

PTL 1: JP 3-066151 A
PTL 2: JP 6-080863 A
PTL 3: JP 8-003365 A

SUMMARY OF INVENTION

Technical Problem

The present invention is made for solving the above problem, and has an object to provide a spherical alumina powder that has a good flowability and that can be practically used.

Solution to Problem

As a result of intensive and extensive studies for solving the above problem, the present inventors have found that the above problem can be solved by the present invention as described below, thus completing the present invention.

Specifically, the present invention is as follows.

[1] A spherical alumina powder having, in a particle size distribution measured with a laser diffraction scattering particle size distribution analyzer, a maximum particle diameter showing a maximum peak in the range of 35 to 70 μm, the maximum particle diameter showing a frequency of 5 to 15%, and an accumulated value of frequencies respectively at 20 particle diameter points, obtained by dividing a particle diameter range of 1 to 20 μm equally into 19 sections, of 3 to 17% by volume, the spherical alumina powder providing a ratio $(V_Y/V_X)$ of a viscosity $V_Y$ of a resin composition Y to a viscosity $V_X$ of a resin composition X of 0.85 or more, the resin composition X containing the spherical alumina powder and a vinyl group-containing polymethylsiloxane, the spherical alumina powder being contained in an amount of 88.1% by mass, the resin composition Y being the same as the resin composition X except for containing the same spherical alumina powder as in the resin composition X in an amount of 79.3% by mass and containing an alumina powder for testing in an amount of 8.8% by mass, the vinyl group-containing polymethylsiloxane and the spherical alumina powder for testing satisfying the following conditions:

the vinyl group-containing polymethylsiloxane
has a viscosity (23° C., JIS K 6209) of 1.1 to 1.3 Pa·s;
the alumina powder for testing
(1) has an average particle diameter (D50) of 6.8 μm, and
(2) has a specific surface area of 0.4 m²/g.
[2] A resin composition containing a resin and the alumina powder according to [1].
[3] A heat dissipation material containing the resin composition according to [2].

Advantageous Effects of Invention

According to the present invention, it is possible to provide a spherical alumina powder that has a good flowability and that can be practically used.

DESCRIPTION OF EMBODIMENTS

An embodiment (this embodiment) of the present invention will be described in detail below.

[Spherical Alumina Powder]

The spherical alumina powder according to this embodiment has, in a particle size distribution measured with a laser diffraction scattering particle size distribution analyzer, a maximum particle diameter showing a maximum peak in the range of 35 to 70 μm, the maximum particle diameter showing a frequency of 5 to 15%, and an accumulated value of frequencies respectively at 20 particle diameter points, obtained by dividing a particle diameter range of 1 to 20 μm equally into 19 sections, of 3 to 17% by volume.

When the maximum particle diameter is out of the above range, rolling resistance increases to increase the viscosity of a resin composition containing the spherical alumina powder. The maximum particle diameter is preferably in the range of 35 to 70 μm.

When the frequency of the maximum particle diameter is not within the range of 5 to 15%, the rolling resistance increases to increase the viscosity of a resin composition containing the spherical alumina powder. The frequency of the maximum particle diameter is preferably in the range of 7 to 11%.

Furthermore, the spherical alumina powder according to this embodiment has an accumulated value of frequencies respectively at 20 particle diameter points (20 particle diameter points of particle diameters of 1 μm, 2 μm, 3 μm, . . . , and 20 μm), obtained by dividing a particle diameter range of 1 to 20 μm equally into 19 sections, of 3 to 17% by volume. When this condition is not satisfied, a liquid crosslinking suppression effect is reduced to increase the viscosity of a resin composition containing the spherical alumina powder. The accumulated value of frequencies in the particle diameter range of 1 to 20 μm is preferably 5 to 14% by volume.

Here, the liquid crosslinking is described. In general, when the powder is densely packed, liquid crosslinking occurs between particles of the powder owing to the effect of moisture on the particle surface. When the liquid crosslinking occurs, the viscosity increases to reduce flowability when the powder is incorporated in a resin composition. In view of such a phenomenon, it is presumed in the present invention that, since the spherical alumina powder particles having small diameters within a particle diameter range of 1 to 20 μm are allowed to exist between the spherical alumina powder particles having the maximum particle diameter showing the maximum peak as a main component or in the void space, liquid crosslinking among the powder is suppressed and a high flowability is exhibited even when the powder is in a dense state.

The spherical alumina powder according to this embodiment gives a ratio $(V_Y/V_X)$ of a viscosity $V_Y$ of a resin composition Y to a viscosity $V_X$ of a resin composition X of 0.85 or more, the resin composition X containing the spherical alumina powder and a vinyl group-containing polymethylsiloxane, the spherical alumina powder being contained in an amount of 88.1% by mass, and the resin composition Y being the same as the resin composition X except for containing the same spherical alumina powder as in the resin composition X in an amount of 79.3% by mass and containing an alumina powder for testing in an amount of 8.8% by mass (provided that the vinyl group-containing polymethylsiloxane and the spherical alumina powder for testing satisfy the following conditions).

[Vinyl Group-Containing Polymethylsiloxane]

Viscosity (23° C., JIS K 6209): 1.1 to 1.3 Pa·s

[Alumina Powder for Testing]

(1) Average particle diameter (D50): 6.8 μm (2) Specific surface area: 0.4 m²/g

As the vinyl group-containing polymethylsiloxane, trade name YE5822A liquid manufactured by Momentive Performance Materials Japan Inc. (viscosity 1.2 Pa·s) is preferably used. As the alumina powder for testing, trade name DAW-05 manufactured by DENKA COMPANY LIMITED is preferably used.

Here, the resin composition Y has a particle size distribution closer to that of a close-packed structure, and the ratio $(V_Y/V_X)$ of the viscosity $V_X$ of the resin composition X and the viscosity $V_Y$ of the resin composition Y being 0.85 or more means a particle size distribution in which an action to suppress liquid crosslinking between particles is effectively exhibited. That is, $V_Y/V_X$ of less than 0.85 corresponds to a particle size distribution in which a viscosity increase due to liquid crosslinking is not suppressed. Although the upper limit is not particularly provided, $V_Y/V_X$ is preferably 0.9 to 1.1.

For $V_Y V_X$ within the above range, for example, out of frequencies respectively at 20 particle diameter points (20 particle diameter points of particle diameters of 1 μm, 2 μm, 3 μm, . . . , and 20 μm) obtained by dividing a particle diameter range of 1 to 20 μm equally into 19 sections, preferably, frequencies respectively at at least 6 particle diameter points are 0.1% or more, and more preferably, out of the 20 particle diameter points, frequencies respectively at at least 9 particle diameter points are 0.1% or more.

In this description, the maximum peak is measured with a laser diffraction scattering particle size distribution analyzer as described above, and specifically, can be measured and calculated by a method described in the section of Examples.

The accumulated value of frequencies in the particle size zone in the peak range having the maximum peak is preferably 70% by volume or more, and more preferably 75 to 90% by volume. When the accumulated value of the frequencies is 70% by volume or more, an increase in viscosity can be prevented.

Here, the peak range having the maximum peak means a range from the particle diameter of 20 μm via the maximum peak to a particle diameter with the minimum frequency, and is preferably a particle diameter range of 20 to 100 μm. The diameter with the maximum frequency within the above range is the maximum particle diameter.

The average particle diameter of the spherical alumina powder according to this embodiment is preferably 35 to 70 μm, and more preferably 40 to 60 μm. When the average particle diameter is 35 to 70 μm, an increase in viscosity can be prevented.

Here, the average particle diameter is cumulative 50% diameter (D50) on a volume basis measured with a laser diffraction scattering particle size distribution analyzer, and can be measured and calculated by a method described in the section of Examples. The cumulative 10% diameter (D10) is a cumulative 10% diameter on a volume basis, and the cumulative 90% diameter (D90) is a cumulative 90% diameter on a volume basis.

The average spheroidicity of the spherical alumina powder according to this embodiment is preferably 0.9 or more, and more preferably 0.92 to 1. When the average spheroidicity is 0.9 or more, an increase in viscosity can be prevented.

Here, the average spheroidicity can be measured and calculated by a method described in the section of Examples.

The specific surface area is preferably 0.1 to 0.4 m²/g, and more preferably 0.2 to 0.3 m²/g. When the specific surface area is 0.1 to 0.4 m²/g, an increase in viscosity can be prevented.

Here, the specific surface area is a value based on a BET method, and can be measured and calculated by a single point BET method.

The spherical alumina powder according to this embodiment can be produced, for example, as follows.

The alumina raw material powder as a raw material is preferably alumina powder or aluminum hydroxide powder.

An alumina raw material powder having almost the same average particle diameter as a desired maximum particle diameter is put into high-temperature flame formed with a fuel gas, such as hydrogen, natural gas, acetylene gas, propane gas, butane, or liquified petroleum gas (LPG), whereby the alumina raw material powder is melt-spheroidized to produce a first spherical alumina powder.

In the same manner, an alumina raw material powder having an average particle diameter of 1 to 20 μm is melt-spheroidized to produce a second spherical alumina powder.

Note that the average spheroidicity and specific surface area of the spherical alumina powders can be adjusted by controlling at least any one of the inner temperature of a furnace in which the high-temperature flame is formed, the particle diameter of the alumina raw material powder, and the charged amount thereof.

Next, the particle size distribution of the first spherical alumina powder is adjusted into a desired range using a sieve, a precise air classifier, or the like. In the same manner, the particle size distribution of the second spherical alumina powder is adjusted into a desired range using a sieve, a precise air classifier, or the like.

The desired range here refers to such a range that frequencies respectively at at least 6 particle diameter points, out of frequencies respectively at 20 particle diameter points obtained by dividing a particle diameter range of 1 to 20 μm equally into 19 sections, are each 0.1% or more, or such a range that the maximum particle diameter showing a maximum peak is in the range of 35 to 70 μm and the frequency of the maximum particle diameter is 5 to 15%, for example.

By adjusting the feed or the like in a precise air classifier, the peak shape of the particle size distribution can be made sharper or broader.

In particular, for making $V_y/V_x$ into 0.85 or more, the particle size distribution is preferably adjusted by a precise air classifier so that, out of frequencies respectively at 20 particle diameter points (20 particle diameter points of particle diameters of 1 μm, 2 μm, 3 μm, . . . , and 20 μm) obtained by dividing a particle diameter range of 1 to 20 μm equally into 19 sections, frequencies respectively at at least 6 particle diameter points are each 0.1% or more.

[Resin Composition, Heat Dissipation Material]

The resin composition according to the present invention contains a resin and the alumina powder of the present invention as described above. The heat dissipation material according to the present invention contains the resin composition of the present invention as described above.

As the resin, for example, a silicone resin, an epoxy resin, a phenol resin, a melamine resin, a urea resin, an unsaturated polyester, a fluororesin, a polyamide, such as polyimide, polyamideimide, or polyether imide, a polyester, such as polybutylene terephthalate or polyethylene terephthalate, polyphenylene sulfide, a wholly aromatic polyester, a polysulfone, a liquid crystal polymer, a polyether sulfone, a polycarbonate, a maleimide-modified resin, an ABS resin, an AAS (acrylonitrile-acrylic rubber-styrene) resin, or an AES (acrylonitrile-ethylene propylene diene rubber-styrene) resin can be used.

Among them, a resin for the heat dissipation material is preferably a silicone resin, and is preferably at least one of an addition reaction-type silicone resin and a condensation reaction-type silicone resin. As required, a part of a silicone resin may be replaced with a silicone rubber. The silicone rubber is preferably at least one of an addition reaction-type silicone rubber and a peroxide vulcanization-type silicone rubber.

The silicone resin and the silicone rubber are each preferably one containing, as a main component, an organopolysiloxane represented by an average compositional formula of $R^1{}_n SiO_{(4-n)/2}$ (in the formula, $R^1$'s are unsaturated or saturated monovalent hydrocarbon groups which are the same as or different from each other and n is a positive number of 1.98 to 2.02).

Specific examples of the silicone resin include a one-part silicone having both of a vinyl group and an H—Si group in one molecule or a two-part silicone of an organopolysiloxane having a vinyl group at an end or in a side chain. Examples of commercial products thereof include trade name "XE14-8530" and "TSE-3062" and trade name "YE5822" manufactured by Toshiba Silicone.

In the resin composition or the heat dissipation material of the present invention, the following components can be blended as required. Specifically, as stress reducers, a silicone rubber, a polysulfide rubber, an acrylic rubber, a butadiene rubber, rubber-like substances, such as a styrene block copolymer and a saturated elastomer, various thermoplastic resins, and a resin obtained by partially or entirely modifying an epoxy resin or a phenol resin with an aminosilicone, an epoxysilicone, an alkoxysilicone, or the like are exemplified.

As silane coupling agents, epoxysilanes, such as γ-glycidoxypropyltrimethoxysilane and β-(3,4-epoxycyclohexy) ethyltrimethoxysilane, aminosilanes, such as aminopropyltriethoxysilane, ureidopropyltriethoxysilane, phenylaminosilane, and N-phenylaminopropyltrimethoxysilane, hydrophobic silane compounds, such as phenyltrimethoxysilane, methyltrimethoxysilane, and octadecyltrimethoxysilane, and a mercaptosilane are exemplified.

As surface treatment agents, a Zr chelete, a titanate coupling agent and an aluminum-based coupling agent are exemplified.

As flame retardants, a halogenated epoxy resin and a phosphorus compound are exemplified, and as colorants, carbon black, iron oxide, a dye, and a pigment are exemplified.

As flame-retardant auxiliaries, $Sb_2O_3$, $Sb_2O_4$, and $Sb_2O_5$ are exemplified As mold releasing agents, a natural wax, a synthetic wax, a linear fatty acid metal salt, an acid amide, an ester, and paraffin are exemplified.

The content of the spherical alumina powder of the present invention in the resin component or in the heat dissipation material is preferably 50 to 95% by mass. With a content in this range, a desired heat resistance, moldability, and the like can be achieved.

The resin composition or the heat dissipation material of this embodiment can be produced by blending predetermined amounts of the aforementioned materials with a blender, a Henschel mixer, or the like, then kneading the blended materials with a heat roll, a kneader, a single-screw or a twin-screw extruder, or the like, followed by cooling, and appropriately pulverizing the resultant.

In forming the resin composition or the heat dissipation material, the spherical alumina powder of the present invention may be subjected to a surface treatment with a silane coupling agent or the like as described above, whereby the water absorption of the powder can be reduced, the strength of the resin composition can be increased, and furthermore, the interface resistance between the resin and the powder can be decreased to further increase the thermal conductivity.

The heat dissipation material according to this embodiment is preferably a thin-shaped molded article of, for example, a sheet form, and examples of the processing method include conventionally known methods, such as a doctor blade method, a coating with a comma coater, and an extrusion method. The thickness of the heat dissipation material of a sheet shape is preferably 0.3 mm or more.

EXAMPLES

The present invention will be more specifically described with reference to Examples and Comparative Examples, but the present invention is not to be limited to the following Examples without departing from the gist thereof.

Example 1

(Production of First Spherical Alumina Powder)

An alumina powder was subjected to a spheroidizing treatment by putting the alumina powder into flame formed with LPG and oxygen gas, followed by a classification treatment by cyclone classification, thereby obtaining an alumina powder having an average spheroidicity of 0.92 and an average particle diameter of 45 μm.

(Production of Second Spherical Alumina Powder)

An alumina powder was subjected to a spheroidizing treatment by putting the alumina powder into flame formed with LPG and oxygen gas, followed by a classification treatment by cyclone classification, thereby obtaining an alumina powder having an average spheroidicity of 0.92 and an average particle diameter of 6 μm.

Note that the average particle diameter and the average spheroidicity were measured as follows (the same applies to the following Examples and Comparative Examples).

(Measurement Method of Average Particle Diameter)

The average particle diameter (on a volume basis) of a spherical alumina powder was measured with a laser diffraction scattering method (Microtrac (trade name "MT3300EX II" manufactured by Nikkiso Co., Ltd.)).

(Measurement Method of Average Spheroidicity)

The average spheroidicity of a spherical alumina powder was measured with a flow-type particle image analyzer of trade name "FPIA-3000" manufactured by Sysmex Corporation as follows. The projected area (A) and the perimeter (PM) of a particle were measured on a particle image. When the area of the perfect circle corresponding to the perimeter (PM) is taken as (B), the spheroidicity of the particle can be expressed as A/B. Thus, when a perfect circle having the same perimeter as the perimeter (PM) of a sample particle is considered, $PM=2\pi r$ and $B=\pi r^2$, so $B=\pi \times (PM/2\pi)^2$, and thus, the spheroidicity of each particle can be calculated as $circularity=A/B=A\times 4\pi/(PM)^2$. This was measured for arbitrarily selected 100 or more particles, and the square of the average was taken as average spheroidicity. A measurement solution was prepared by adding 20 ml of distilled water and 10 ml of propylene glycol to 0.1 g of a sample, followed by an ultrasonic dispersion treatment for 3 minutes.

The first spherical alumina powder and the second spherical alumina powder were mixed at a volume ratio of 5:95 to produce a spherical alumina powder of Example 1 (average particle diameter: 45 μm, specific surface area: 0.2 m²/g).

The particle size distribution (particle diameters and frequencies) of the spherical alumina powder of Example 1 was measured by a laser diffraction scattering method. For measurement, the Microtrac as described above was used as a particle size distribution analyzer.

The results are shown in Table 1 below.

The produced spherical alumina powder was put into a vinyl group-containing polymethylsiloxane (trade name YE5822A liquid manufactured by Momentive Performance Materials Japan Inc.) so as to give 65% by volume (88.1% by mass) in a resin composition, followed by stirring and a defoaming treatment, thereby preparing a resin composition X.

A resin composition Y was prepared in the same manner as the resin composition X except for changing the amount of the same spherical alumina powder as in the resin composition X to 79.3% by mass and adding an alumina powder for testing (trade name DAW-05 manufactured by DENKA COMPANY LIMITED) in an amount of 8.8% by mass. Each of the viscosity $V_X$ of the resin composition X and the viscosity $V_Y$ was measured at a temperature of 30° C. using a Brookfield viscometer (trade name "TVB-10" manufactured by Toki Sangyo Co., Ltd). The ratio thereof ($V_Y/V_X$) was also determined. The viscosity $V_X$ of the resin composition X and $V_Y/V_X$ are shown in Table 1 below. The viscosity is preferably 100 Pa·s or less.

Here, the vinyl group-containing polymethylsiloxane and the spherical alumina powder for testing had the following properties.

[Vinyl Group-Containing Polymethylsiloxane]
(1) Viscosity (23° C. JIS K 6209): 1.2 Pa·s

[Alumina Powder for Testing]
(1) Average particle diameter (D50): 6.8 μm
(2) Specific surface area: 0.4 m²/g

Example 2

(Production of First Spherical Alumina Powder)

An alumina powder was subjected to a spheroidizing treatment by putting the alumina powder into flame formed with LPG and oxygen gas, followed by a classification treatment by cyclone classification, thereby obtaining an alumina powder having an average spheroidicity of 0.92 and an average particle diameter of 44 μm.

(Production of Second Spherical Alumina Powder)

An alumina powder was subjected to a spheroidizing treatment by putting the alumina powder into flame formed with LPG and oxygen gas, followed by a classification treatment by cyclone classification, thereby obtaining an alumina powder having an average spheroidicity of 0.92 and an average particle diameter of 4 μm.

The first spherical alumina powder and the second spherical alumina powder were mixed at a volume ratio of 15:85 to produce a spherical alumina powder of Example 2 (average particle diameter: 40 μm, specific surface area: 0.3 m²/g).

A resin composition was produced in the same manner as in Example 1 using the spherical alumina powder, and the viscosity of the produced resin composition was measured. The result is shown in Table 1 below.

Example 3

(Production of First Spherical Alumina Powder)

An alumina powder was subjected to a spheroidizing treatment by putting the alumina powder into flame formed with LPG and oxygen gas, followed by a classification treatment by cyclone classification, thereby obtaining an alumina powder having an average spheroidicity of 0.92 and an average particle diameter of 42 μm.

(Production of Second Spherical Alumina Powder)

An alumina powder was subjected to a spheroidizing treatment by putting the alumina powder into flame formed with LPG and oxygen gas, followed by a classification treatment by cyclone classification, thereby obtaining an alumina powder having an average spheroidicity of 0.92 and an average particle diameter of 5 μm.

The first spherical alumina powder and the second spherical alumina powder were mixed at a volume ratio of 5:95 to produce a spherical alumina powder of Example 3 (average particle diameter: 43 μm, specific surface area: 0.2 m²/g).

A resin composition was produced in the same manner as in Example 1 using the spherical alumina powder, and the viscosity of the produced resin composition was measured. The result is shown in Table 1 below.

Example 4

(Production of First Spherical Alumina Powder)

An alumina powder was subjected to a spheroidizing treatment by putting the alumina powder into flame formed with LPG and oxygen gas, followed by a classification treatment by cyclone classification, thereby obtaining an alumina powder having an average spheroidicity of 0.92 and an average particle diameter of 55 μm.

(Production of Second Spherical Alumina Powder)

An alumina powder was subjected to a spheroidizing treatment by putting the alumina powder into flame formed with LPG and oxygen gas, followed by a classification treatment by cyclone classification, thereby obtaining an alumina powder having an average spheroidicity of 0.92 and an average particle diameter of 7 μm.

The first spherical alumina powder and the second spherical alumina powder were mixed at a volume ratio of 15:85 to produce a spherical alumina powder of Example 4 (average particle diameter: 52 μm, specific surface area: 0.3 m²/g).

A resin composition was produced in the same manner as in Example 1 using the spherical alumina powder, and the viscosity of the produced resin composition was measured. The result is shown in Table 1 below.

Example 5

(Production of First Spherical Alumina Powder)

An alumina powder was subjected to a spheroidizing treatment by putting the alumina powder into flame formed with LPG and oxygen gas, followed by a classification treatment by cyclone classification, thereby obtaining an alumina powder having an average spheroidicity of 0.92 and an average particle diameter of 37 μm.

(Production of Second Spherical Alumina Powder)

An alumina powder was subjected to a spheroidizing treatment by putting the alumina powder into flame formed with LPG and oxygen gas, followed by a classification treatment by cyclone classification, thereby obtaining an alumina powder having an average spheroidicity of 0.92 and an average particle diameter of 6 μm.

The first spherical alumina powder and the second spherical alumina powder were mixed at a volume ratio of 15:85 to produce a spherical alumina powder of Example 5 (average particle diameter: 36 μm, specific surface area: 0.2 m²/g).

A resin composition was produced in the same manner as in Example 1 using the spherical alumina powder, and the viscosity of the produced resin composition was measured. The result is shown in Table 1 below.

Example 6

(Production of First Spherical Alumina Powder)

An alumina powder was subjected to a spheroidizing treatment by putting the alumina powder into flame formed with LPG and oxygen gas, followed by a classification treatment by cyclone classification, thereby obtaining an alumina powder having an average spheroidicity of 0.92 and an average particle diameter of 56 μm.

(Production of Second Spherical Alumina Powder)

An alumina powder was subjected to a spheroidizing treatment by putting the alumina powder into flame formed with LPG and oxygen gas, followed by a classification treatment by cyclone classification, thereby obtaining an alumina powder having an average spheroidicity of 0.92 and an average particle diameter of 4 μm.

The first spherical alumina powder and the second spherical alumina powder were mixed at a volume ratio of 5:95 to produce a spherical alumina powder of Example 6 (average particle diameter: 55 μm, specific surface area: 0.2 m²/g).

A resin composition was produced in the same manner as in Example 1 using the spherical alumina powder, and the viscosity of the produced resin composition was measured. The result is shown in Table 1 below.

Example 7

(Production of First Spherical Alumina Powder)

An alumina powder was subjected to a spheroidizing treatment by putting the alumina powder into flame formed with LPG and oxygen gas, followed by a classification treatment by cyclone classification, thereby obtaining an alumina powder having an average spheroidicity of 0.92 and an average particle diameter of 49 μm.

(Production of Second Spherical Alumina Powder)

An alumina powder was subjected to a spheroidizing treatment by putting the alumina powder into flame formed with LPG and oxygen gas, followed by a classification treatment by cyclone classification, thereby obtaining an alumina powder having an average spheroidicity of 0.92 and an average particle diameter of 3 μm.

The first spherical alumina powder and the second spherical alumina powder were mixed at a volume ratio of 10:90 to produce a spherical alumina powder of Example 7 (average particle diameter: 44 μm, specific surface area: 0.20 m²/g).

A resin composition was produced in the same manner as in Example 1 using the spherical alumina powder, and the viscosity of the produced resin composition was measured. The result is shown in Table 1 below.

Example 8

(Production of First Spherical Alumina Powder)

An alumina powder was subjected to a spheroidizing treatment by putting the alumina powder into flame formed with LPG and oxygen gas, followed by a classification treatment by cyclone classification, thereby obtaining an alumina powder having an average spheroidicity of 0.92 and an average particle diameter of 56 μm.

(Production of Second Spherical Alumina Powder)

An alumina powder was subjected to a spheroidizing treatment by putting the alumina powder into flame formed with LPG and oxygen gas, followed by a classification treatment by cyclone classification, thereby obtaining an alumina powder having an average spheroidicity of 0.92 and an average particle diameter of 5 μm.

The first spherical alumina powder and the second spherical alumina powder were mixed at a volume ratio of 20:80 to produce a spherical alumina powder of Example 8 (average particle diameter: 52 μm, specific surface area: 0.2 m²/g).

A resin composition was produced in the same manner as in Example 1 using the spherical alumina powder, and the viscosity of the produced resin composition was measured. The result is shown in Table 1 below.

Comparative Example 1

(Production of First Spherical Alumina Powder)

An alumina powder was subjected to a spheroidizing treatment by putting the alumina powder into flame formed with LPG and oxygen gas, followed by a classification treatment by cyclone classification, thereby obtaining an alumina powder having an average spheroidicity of 0.92 and an average particle diameter of 54 μm.

(Production of Second Spherical Alumina Powder)

An alumina powder was subjected to a spheroidizing treatment by putting the alumina powder into flame formed with LPG and oxygen gas, followed by a classification treatment by cyclone classification, thereby obtaining an alumina powder having an average spheroidicity of 0.92 and an average particle diameter of 5 μm.

The first spherical alumina powder and the second spherical alumina powder were mixed at a volume ratio of 20:80 to produce a spherical alumina powder of Comparative Example 1 (average particle diameter: 48 μm, specific surface area: 0.2 m²/g).

A resin composition was produced in the same manner as in Example 1 using the spherical alumina powder, and the viscosity of the produced resin composition was measured. The result is shown in Table 1 below.

Comparative Example 2

(Production of First Spherical Alumina Powder)

An alumina powder was subjected to a spheroidizing treatment by putting the alumina powder into flame formed with LPG and oxygen gas, followed by a classification treatment by cyclone classification, thereby obtaining an alumina powder having an average spheroidicity of 0.92 and an average particle diameter of 45 μm.

(Production of Second Spherical Alumina Powder)

An alumina powder was subjected to a spheroidizing treatment by putting the alumina powder into flame formed with LPG and oxygen gas, followed by a classification treatment by cyclone classification, thereby obtaining an alumina powder having an average spheroidicity of 0.92 and an average particle diameter of 5 μm.

The first spherical alumina powder and the second spherical alumina powder were mixed at a volume ratio of 2:98 to produce a spherical alumina powder of Comparative Example 2 (average particle diameter: 44 μm, specific surface area: 0.1 m²/g).

A resin composition was produced in the same manner as in Example 1 using the spherical alumina powder, and the viscosity of the produced resin composition was measured. The result is shown in Table 1 below.

Comparative Example 3

(Production of First Spherical Alumina Powder)

An alumina powder was subjected to a spheroidizing treatment by putting the alumina powder into flame formed with LPG and oxygen gas, followed by a classification treatment by cyclone classification, thereby obtaining an alumina powder having an average spheroidicity of 0.92 and an average particle diameter of 45 μm.

(Production of Second Spherical Alumina Powder)

An alumina powder was subjected to a spheroidizing treatment by putting the alumina powder into flame formed with LPG and oxygen gas, followed by a classification treatment by cyclone classification, thereby obtaining an alumina powder having an average spheroidicity of 0.92 and an average particle diameter of 5 μm.

The first spherical alumina powder and the second spherical alumina powder were mixed at a volume ratio of 20:80 to produce a spherical alumina powder of Comparative Example 3 (average particle diameter: 41 μm, specific surface area: 0.4 m²/g).

A resin composition was produced in the same manner as in Example 1 using the spherical alumina powder, and the viscosity of the produced resin composition was measured. The result is shown in Table 1 below.

Comparative Example 4

(Production of First Spherical Alumina Powder)

An alumina powder was subjected to a spheroidizing treatment by putting the alumina powder into flame formed with LPG and oxygen gas, followed by a classification treatment by cyclone classification, thereby obtaining an alumina powder having an average spheroidicity of 0.92 and an average particle diameter of 60 μm.

(Production of Second Spherical Alumina Powder)

An alumina powder was subjected to a spheroidizing treatment by putting the alumina powder into flame formed with LPG and oxygen gas, followed by a classification treatment by cyclone classification, thereby obtaining an alumina powder having an average spheroidicity of 0.92 and an average particle diameter of 5 μm.

The first spherical alumina powder and the second spherical alumina powder were mixed at a volume ratio of 5:95 to produce a spherical alumina powder of Comparative Example 4 (average particle diameter: 59 μm, specific surface area: 0.2 m²/g).

A resin composition was produced in the same manner as in Example 1 using the spherical alumina powder, and the viscosity of the produced resin composition was measured. The result is shown in Table 1 below.

Comparative Example 5

(Production of First Spherical Alumina Powder)

An alumina powder was subjected to a spheroidizing treatment by putting the alumina powder into flame formed with LPG and oxygen gas, followed by a classification treatment by cyclone classification, thereby obtaining an alumina powder having an average spheroidicity of 0.92 and an average particle diameter of 44 μm.

(Production of Second Spherical Alumina Powder)

An alumina powder was subjected to a spheroidizing treatment by putting the alumina powder into flame formed with LPG and oxygen gas, followed by a classification treatment by cyclone classification, thereby obtaining an alumina powder having an average spheroidicity of 0.92 and an average particle diameter of 5 μm.

The first spherical alumina powder and the second spherical alumina powder were mixed at a volume ratio of 15:85 to produce a spherical alumina powder of Comparative Example 5 (average particle diameter: 39 μm, specific surface area: 0.2 m²/g).

A resin composition was produced in the same manner as in Example 1 using the spherical alumina powder, and the viscosity of the produced resin composition was measured. The result is shown in Table 1 below.

Comparative Example 6

(Production of First Spherical Alumina Powder)

An alumina powder was subjected to a spheroidizing treatment by putting the alumina powder into flame formed with LPG and oxygen gas, followed by a classification treatment by cyclone classification, thereby obtaining an alumina powder having an average spheroidicity of 0.92 and an average particle diameter of 46 μm.

(Production of Second Spherical Alumina Powder)

An alumina powder was subjected to a spheroidizing treatment by putting the alumina powder into flame formed with LPG and oxygen gas, followed by a classification treatment by cyclone classification, thereby obtaining an alumina powder having an average spheroidicity of 0.92 and an average particle diameter of 10 μm.

The first spherical alumina powder and the second spherical alumina powder were mixed at a volume ratio of 15:85 to produce a spherical alumina powder of Comparative Example 6 (average particle diameter: 42 μm, specific surface area: 0.2 m²/g).

A resin composition was produced in the same manner as in Example 1 using the spherical alumina powder, and the viscosity of the produced resin composition was measured. The result is shown in Table 1 below.

14 an accumulated value of frequencies respectively at 20 particle diameter points, obtained by dividing a particle diameter range of 1 to 20 μm equally into 19 sections, of 3 to 17% by volume, the spherical alumina powder providing a ratio ($V_Y/V_X$) of a viscosity $V_Y$ of a resin composition Y to a viscosity $V_X$ of a resin composition X of 0.85 or more, the resin composition X containing the spherical alumina powder and a vinyl group-containing polymethylsiloxane, the spherical alumina powder being contained in an amount of 88.1% by mass, the resin composition Y being the same as the resin composition X except for containing the same spherical alumina

TABLE 1

| | Example | | | | | | | | Comparative Example | | | | | |
| | 1 | 2 | 3 | 4 | 5 | 6 | 7 | 8 | 1 | 2 | 3 | 4 | 5 | 6 |
|---|---|---|---|---|---|---|---|---|---|---|---|---|---|---|
| Maximum particle diameter (μm) | 48 | 52 | 44 | 57 | 40 | 64 | 52 | 57 | 57 | 48 | 48 | 74 | 52 | 57 |
| Frequency of maximum particle diameter (%) | 11 | 10 | 11 | 7 | 7 | 10 | 6 | 11 | 8 | 11 | 7 | 10 | 4 | 16 |
| Accumulated vale of frequencies in 1-20 μm particle diameter range (% by volume) | 6 | 12 | 3 | 14 | 10 | 6 | 11 | 5 | 3 | 1 | 18 | 5 | 14 | 4 |
| $V_y/V_x$ | 0.9 | 1.0 | 0.9 | 1.0 | 0.9 | 1.1 | 0.9 | 0.9 | 0.8 | 0.9 | 1.0 | 0.9 | 1.0 | 0.9 |
| Number of points with a frequency of 0.1% or more, out of frequencies respectively at 20 particle diameter points obtained by dividing 1-20 μm particle diameter range equally into 19 sections | 6 | 17 | 8 | 18 | 17 | 7 | 13 | 9 | 4 | 6 | 17 | 9 | 16 | 8 |
| Number of points with a frequency of 0.2% or more, out of frequencies respectively at 20 particle diameter points obtained by dividing 1-20 μm particle diameter range equally into 19 sections | 5 | 16 | 7 | 17 | 16 | 6 | 12 | 8 | 4 | 5 | 16 | 7 | 15 | 7 |
| Accumulated value of frequencies in particle size zone corresponding to maximum peak (% by volume) | 90 | 68 | 95 | 79 | 87 | 89 | 83 | 90 | 77 | 98 | 69 | 87 | 70 | 91 |
| Viscosity (Pa · s) | 86 | 89 | 90 | 88 | 91 | 80 | 90 | 86 | 101 | 103 | 102 | 101 | 106 | 102 |

INDUSTRIAL APPLICABILITY

The spherical alumina powder of the present invention is suitably used as a filler of a thermoconductive resin composition. The resin composition of the present invention is used as a heat dissipation member for countermeasure against heat in personal computers, automobiles, portable electronic equipment, household electric appliances, and the like.

The invention claimed is:

1. A resin composition comprising a resin and a spherical alumina powder, the spherical alumina powder having, in a particle size distribution measured with a laser diffraction scattering particle size distribution analyzer, a maximum particle diameter showing a maximum peak in the range of 35 to 70 μm, the maximum particle diameter showing a frequency of 5 to 15%, and powder as in the resin composition X in an amount of 79.3% by mass and containing an alumina powder for testing in an amount of 8.8% by mass, the vinyl group-containing polymethylsiloxane and the spherical alumina powder for testing satisfying the following conditions:

the vinyl group-containing polymethylsiloxane has a viscosity (23° C., JIS K 6209) of 1.1 to 1.3 Pa·s;

the alumina powder for testing (1) has an average particle diameter (D50) of 6.8 μm, and (2) has a specific surface area of 0.4 m₂/g, wherein the resin is a silicone resin, a fluororesin, a polyamide, a polyimide, a polyamideimide, a polyether imide or a polysulfone.

2. A resin composition material comprising the resin composition according to claim 1.

3. The resin composition according to claim 1, wherein the content of the spherical alumina powder is 50 to 95% by mass.

* * * * *